United States Patent
Burke

(10) Patent No.: US 12,298,756 B1
(45) Date of Patent: *May 13, 2025

(54) SYSTEM AND METHOD FOR MACHINE PROGRAM ANALYSIS

(71) Applicant: Arch Systems Inc., Palo Alto, CA (US)

(72) Inventor: Timothy Matthew Burke, Mountain View, CA (US)

(73) Assignee: Arch Systems Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/588,464

(22) Filed: Feb. 27, 2024

Related U.S. Application Data

(63) Continuation of application No. 18/239,029, filed on Aug. 28, 2023, now Pat. No. 11,947,340.

(60) Provisional application No. 63/401,487, filed on Aug. 26, 2022.

(51) Int. Cl.
*G01R 31/28* (2006.01)
*G05B 19/418* (2006.01)
*G05B 23/02* (2006.01)
*G06F 9/445* (2018.01)
*G06F 9/455* (2018.01)
*G06Q 10/20* (2023.01)

(52) U.S. Cl.
CPC ....... *G05B 23/0275* (2013.01); *G05B 23/024* (2013.01)

(58) Field of Classification Search
CPC ............. G05B 23/0275; G05B 23/024; G05B 13/028; G05B 19/4183; G05B 23/0221; G05B 23/0264; G05B 19/4155; G05B 23/0283; G05B 19/4184; G05B 19/41835; G05B 23/0224; G05B 19/41875; G06Q 10/06316; G06Q 10/10; H04B 17/318; G06N 3/045; G06N 3/084; G06V 20/17; G06V 10/764; G06V 10/82; G01M 99/005; G06F 11/3013; G06F 11/3612; G06F 11/302; G06F 11/3616

See application file for complete search history.

(56) References Cited

U.S. PATENT DOCUMENTS

| | | | |
|---|---|---|---|
| 5,245,421 | A | 9/1993 | Robertson et al. |
| 5,822,542 | A | 10/1998 | Smith et al. |
| 6,760,471 | B1 | 7/2004 | Raymond |

(Continued)

OTHER PUBLICATIONS

Alikhashashneh, A. Enas, et al., "Using Machine Learning Techniques to Classify and Predict Static Code Analysis Tool Warnings", 2018 IEEE/ACS 15th International Conference on Computer Systems and Applications (AICCSA), Aqaba, Jordan, 2018, pp. 1-8, doi: 10.1109/AICCSA.2018.8612819.

(Continued)

*Primary Examiner* — Thuy Dao
(74) *Attorney, Agent, or Firm* — Jeffrey Schox; Samuel Rosenthal

(57) ABSTRACT

A method for machine program analysis, preferably including determining data for a set of programs and determining relationships between the set of programs, and optionally including determining an analysis based on the program relationships, acting based on analyses, and/or operating manufacturing system machines. A system for machine program analysis, preferably including one or more computing systems, and optionally including one or more manufacturing systems.

23 Claims, 6 Drawing Sheets

(56) References Cited

U.S. PATENT DOCUMENTS

| | | | |
|---|---|---|---|
| 6,937,914 B1* | 8/2005 | Bode | G05B 19/41865 |
| | | | 702/182 |
| 9,170,809 B1 | 10/2015 | Cohen et al. | |
| 10,963,346 B2 | 3/2021 | Garvey et al. | |
| 10,997,517 B2 | 5/2021 | Garvey et al. | |
| 11,598,801 B2* | 3/2023 | Burke | H05K 13/0895 |
| 11,886,177 B1 | 1/2024 | Burke | |
| 2006/0155425 A1 | 7/2006 | Howlett et al. | |
| 2007/0047797 A1 | 3/2007 | Vilella | |
| 2008/0307643 A1 | 12/2008 | Sozansky | |
| 2009/0040167 A1 | 2/2009 | Sun | |
| 2009/0262743 A1 | 10/2009 | Uyehara et al. | |
| 2014/0036459 A1 | 2/2014 | Gutierrez et al. | |
| 2017/0215493 A1 | 8/2017 | Maxey et al. | |
| 2018/0175582 A1 | 6/2018 | Rothberg et al. | |
| 2018/0300865 A1 | 10/2018 | Weiss et al. | |
| 2019/0019280 A1 | 1/2019 | Rao et al. | |
| 2020/0126829 A1 | 4/2020 | Matsui et al. | |
| 2020/0387601 A1 | 12/2020 | Schat | |
| 2023/0148312 A1 | 5/2023 | Niemczuk et al. | |
| 2023/0186252 A1 | 6/2023 | Burke et al. | |
| 2023/0305527 A1* | 9/2023 | Li | G05B 19/4155 |

OTHER PUBLICATIONS

Burke, Timothy Matthew, "System and Method for Machine Program Analysis", U.S. Appl. No. 18/239,029, filed Aug. 28, 2023.
Burke, Timothy Matthew, "System and Method for Manufacturing System Data Analysis", U.S. Appl. No. 18/239,044, filed Aug. 28, 2023.
Dunning, Ted , et al., "Computing Extremely Accurate Quantiles Using t-Digests", https://arxiv.org/abs/1902.04023, Feb. 11, 2019.

* cited by examiner

US 12,298,756 B1

SYSTEM AND METHOD FOR MACHINE PROGRAM ANALYSIS

CROSS-REFERENCE TO RELATED APPLICATIONS

This application is a continuation of U.S. patent application Ser. No. 18/239,029, filed 28 Aug. 2023, which claims the benefit of U.S. Provisional Application Ser. No. 63/401,487, filed 26 Aug. 2022, each of which is incorporated in its entirety by this reference.

TECHNICAL FIELD

This invention relates generally to the data analysis field, and more specifically to a new and useful system and method for machine program analysis in the data analysis field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
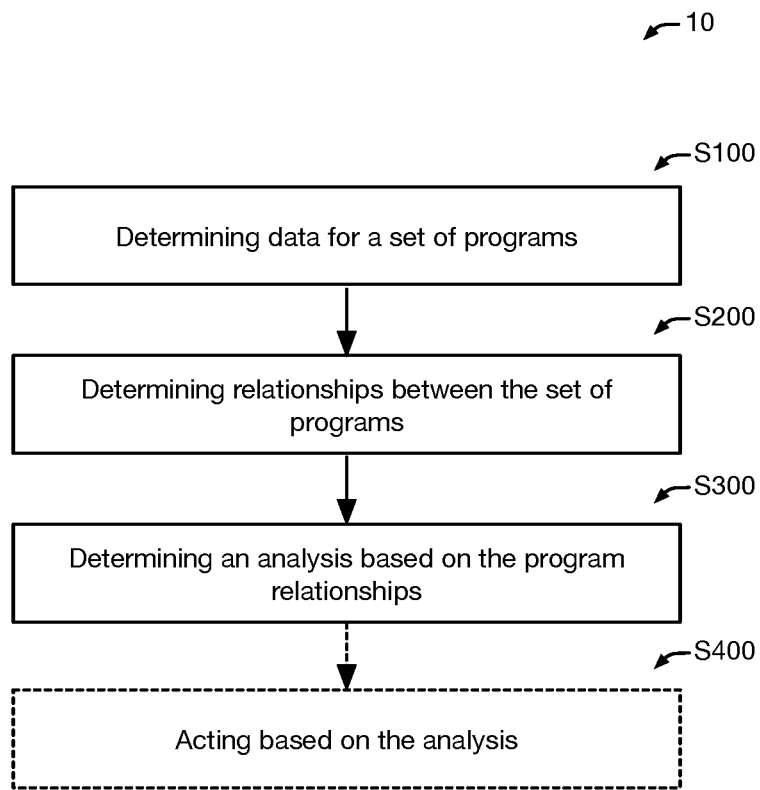
FIG. 1 depicts a schematic representation of a variant of the method.

As shown by way of example in FIG. 1, variants of the method 10 for machine program analysis preferably include: determining data for a set of programs S100 and determining relationships between the set of programs S200; further, variants of the method can optionally include determining an analysis based on the program relationships S300, acting based on analyses S400, and/or operating manufacturing system machines S15. However, the method can additionally and/or alternatively include any other suitable elements. The method preferably functions to determine a series of programs used to manufacture a component from low-level machine data, with little to no a priori knowledge about the component's manufacturing process. The resultant program series can, in some examples, be used to trace origins of defects discovered on a specific component back to the upstream machines and/or programs that were involved in producing the component.

Figure 2:
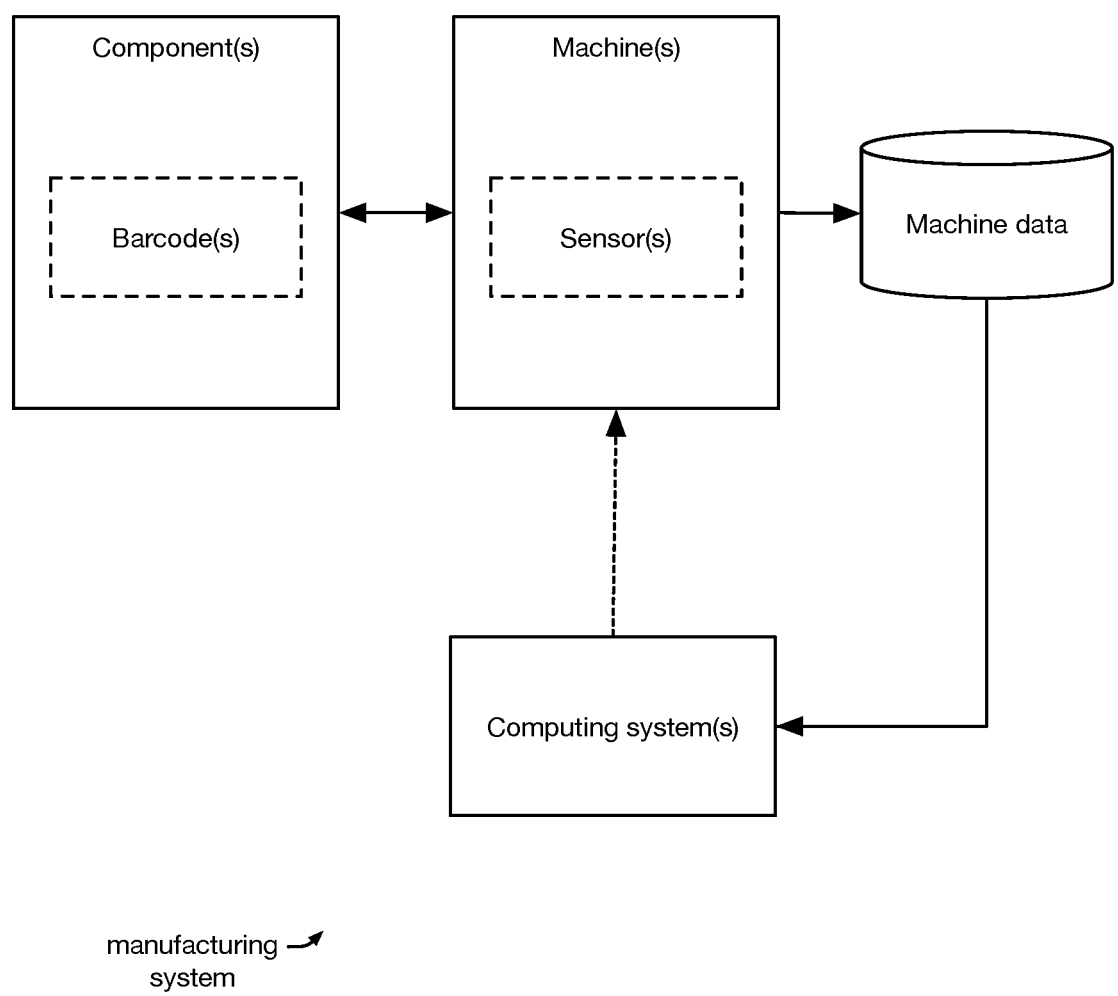
FIG. 2 depicts a schematic representation of a variant of the system.

The method 10 is preferably performed by a system 20 for machine program analysis. The system 20 preferably includes one or more computing systems (e.g., as shown in FIG. 2). The system 20 can additionally or alternatively include and/or be associated with (e.g., directed toward analysis of, such as analysis of programs used by machines thereof and/or relationships between such machines and/or programs) one or more manufacturing systems (or elements thereof), such as described below in more detail. However, the method can additionally or alternatively be performed (in part or in whole) by and/or in association with any other suitable systems (e.g., computing systems, manufacturing systems, etc.).

In an illustrative example, the method can include: determining low-level machine data, such as program session data (e.g., barcode sets scanned during each program session), for programs executed on machines (in a factory and/or other manufacturing system) to manufacture component(s); determining an intersection (e.g., an approximate cardinality of intersection) between different program session pairs using a hyperloglog algorithm (e.g., the intersection between different pairs of barcode sets; estimating the number of unique barcodes shared between a pair of programs and/or program sessions); determining whether the pair of programs are part of the same program series based on the respective intersection (e.g., based on the cardinality of the intersection) and optionally a threshold; and determining a program order within the program series based on the respective timestamps associated with the program session data. The method can optionally include determining a subseries of the program series based on a layout of machines in the factory (e.g., physically-linked machines that are part of the same assembly-line. The method can optionally include determining an analysis (e.g., component defect explainability) based on the resultant program series.

In some examples, the method can include one or more elements (e.g., the entire 'method 100' described therein, or any suitable elements thereof) such as described in U.S. patent application Ser. No. 18/217,757, filed 3 Jul. 2023 and titled "METHOD FOR MANUFACTURING SYSTEM ANALYSIS AND/OR MAINTENANCE", which is herein incorporated in its entirety by this reference. For example, the method for machine program analysis can include 'receiving factory information S110', 'associating metrics with factory components S120', 'acting based on metric associations S130', and/or 'operating factory machines S105' such as described in U.S. patent application Ser. No. 18/217,757 (e.g., wherein one or more of these elements are performed as part of and/or in cooperation with determining an analysis based on the program relationships S300 and/or acting based on the analysis S400, such as wherein determining the analysis S300 may include 'receiving factory information S110' and/or 'associating metrics with factory components S120', and/or wherein acting based on analyses S400 may include 'acting based on metric associations S130'). However, the method can additionally or alternatively include any other suitable elements performed in any suitable manner.

2. Technical Advantages

Variants of the technology can confer several benefits over conventional systems and/or methods.

First, variants of the technology can automatically determine, with relatively high confidence, the series of (machine) programs that are used to manufacture and/or assemble a set of components with minimal or no a priori knowledge about the program series for each component batch. In examples, the technology can determine the program series based on low-level machine data, such as by determining which programs have large proportions of overlapping component identifiers. In some such variants, this can function to help reduce or eliminate manual work associated with creating a 'digital thread' for a product (e.g., readily-accessible log detailing the manufacturing, processing, and/or inspection of the product). In some examples, assembling such a 'digital thread' may be straightforward if every (or substantially every) single manufacturing step scans a unique (or substantially unique) serial number for every (or substantially every) single product and records all (or substantially all) data in association with that serial number. However, these criteria are not typically met in most manufacturing systems. In some examples, serialization may be incomplete (e.g., due to the additional time and/or work required to scan a serial number). In such examples, assembling a digital thread in a fully manual manner is typically highly labor intensive and/or error prone. In contrast, variants of the technology can provide automated and/or semi-automated tools that can function to assist in reducing the number of possibilities for each step in the digital thread, which, in some examples, can entirely remove the need for any manual work, and in other cases can dramatically simplify and/or reduce any such manual work that is still required.

Second, variants of the technology can manage (and/or facilitate management of) the analysis of vast amounts of low-level machine data using distributed systems, which can increase the processing speed and/or decrease the amount of local memory required to perform the analysis. In these variants, the intersections can be determined using distributed cardinality estimation methods, such as a hyperloglog algorithm, and/or other methods.

Third, variants of the technology can enable sophisticated analyses of manufacturing systems and/or the manufactured products produced by those manufacturing systems. For example, some such variants can enable 'root cause' analyses associated with determining potentially-causative links between aspects of manufactured products (e.g., defects detected in the products; variance of metrics, such as performance metrics and/or dimensional metrics, associated with the products; etc.) and the manufacturing system aspects (e.g., tools, tool elements, configuration parameters, etc.) that have some relationship with those products (e.g., as described in U.S. patent application Ser. No. 18/217,757, filed 3 Jul. 2023 and titled "METHOD FOR MANUFACTURING SYSTEM ANALYSIS AND/OR MAINTENANCE", which is herein incorporated in its entirety by this reference).

However, the technology can additionally or alternatively confer any other suitable benefits.

3. Systems

As described above, the system 20 for machine program analysis preferably includes one or more computing systems, and can additionally or alternatively include and/or be associated with (e.g., directed toward analysis of, such as analysis of programs used by machines thereof and/or relationships between such machines and/or programs) one or more manufacturing systems (or elements thereof). In examples, a manufacturing system can include one or more: manufacturing lines, factories, supply chains (e.g., including multiple factories), and/or any suitable subsets thereof.

In some examples, the system 20 and/or manufacturing system(s) can include one or more elements such as described in U.S. patent application Ser. No. 18/217,757, filed 3 Jul. 2023 and titled "METHOD FOR MANUFACTURING SYSTEM ANALYSIS AND/OR MAINTENANCE", which is herein incorporated in its entirety by this reference (e.g., regarding the 'computing systems', 'analysis tools', and/or 'manufacturing systems' described therein). However, the system 20 and/or manufacturing system(s) can additionally or alternatively include any other suitable elements.

In some embodiments, the method can be associated with one or more factories, manufacturing lines, and/or other manufacturing systems (and/or elements thereof) for printed circuit board (PCB) assembly (e.g., one or more surface-mount technology (SMT) PCB manufacturing lines, including one or more assembly and inspection machines). In some embodiments, the method can additionally or alternatively be associated with one or more factories, manufacturing lines, and/or other manufacturing systems (and/or elements thereof) for part fabrication (e.g., including one or more: fabrication tools such as injection molding machines, CNC fabrication machines, stamping machines, bending machines, etc.; assembly tools; and/or inspection tools). In some embodiments, the method can additionally or alternatively be associated with one or more factories, manufacturing lines, and/or other manufacturing systems (and/or elements thereof) for vehicle (e.g., automobile) production (e.g., including one or more component positioning machines, fastening machines such as welding machines, painting machines, part fabrication machines such as described above regarding manufacturing systems for part fabrication, inspection machines, etc.). In some embodiments, the method can additionally or alternatively be associated with one or more factories, manufacturing lines, and/or other manufacturing systems (and/or elements thereof) for carrying out bioprocesses (e.g., including one or more bioreactors, hydrolysis machines, physical separation machines, inspection machines, etc.). In some embodiments, the method can additionally or alternatively be associated with one or more factories, manufacturing lines, and/or other manufacturing systems (and/or elements thereof) for medical device manufacturing, aerospace manufacturing, defense industry manufacturing, and/or manufacturing of any other suitable products and/or for any other suitable industries. However, the method can additionally or alternatively be associated with any other suitable manufacturing systems.

The method can be used to determine the program series for components manufactured: within a single factory, across multiple factories, and/or in any other suitable set of facilities. An entity (e.g., electronics manufacturer) can have one factory, multiple factories, and/or any other suitable number of factories. Each factory can include a set of machines, wherein each machine can concurrently execute one or more programs to manufacture and/or assemble one or more components (example shown in FIG. 2). Each factory can be associated with a layout of machines, or not be associated with a layout of machines.

The set of machines (e.g., manufacturing robots) can function to produce one or more physical components (e.g., electronic components, printed circuit board, injection-molded parts, etc.). Examples of machines can include: pick-and-place (PNP) machines, solder printers, ovens, solder paste inspection (SPI) machines, automated optical inspection (AOI) printers, AXI (automated x-ray inspection) machines, in-circuit test (ICT) machines, functional test (FT) machines, injection molding machines, CNC fabrication machines (e.g., subtractive fabrication machines such as lathes, mills, routers, etc.; additive fabrication machines such as 3D printers; hybrid fabrication machines; etc.), stamping machines, bending machines (e.g., sheet metal bending machines, conduit bending machines, etc.), dimensional inspection machines, semiconductor wafer fabrication and inspection machines, semiconductor die attach and wire bonding machines, microwave test machines, and/or any other suitable machines.

Each machine can be part of an assembly line, or not be part of an assembly line. Each machine can be physically linked to another machine (e.g., by a conveyor belt, a transfer robot, an auger, a feed, another conveyance, etc.), or not be physically linked to a different machine. Machines that are not physically linked to another machine (e.g., a floating asset) can be arranged as a group in a layout of machines, or not be arranged as a group in a layout of machines.

In a first example, physically-linked machines that are part of the same assembly-line include: a solder printer, a SPI machine, a PNP machine, an oven, and a AOI machine. In a second example, a machine that is not physically-linked (that can be part of an assembly-line or not be part of an assembly-line) includes: an AXI machine, an ICT machine, an FT machine, and/or any other suitable machine.

Each machine can include a sensor suite that functions to monitor machine operation, identify components, and/or otherwise determine machine data. Examples of sensors can include: barcode scanners, touchscreens, optical sensors, cameras, microphones, and/or any other suitable sensors.

Figure 5:
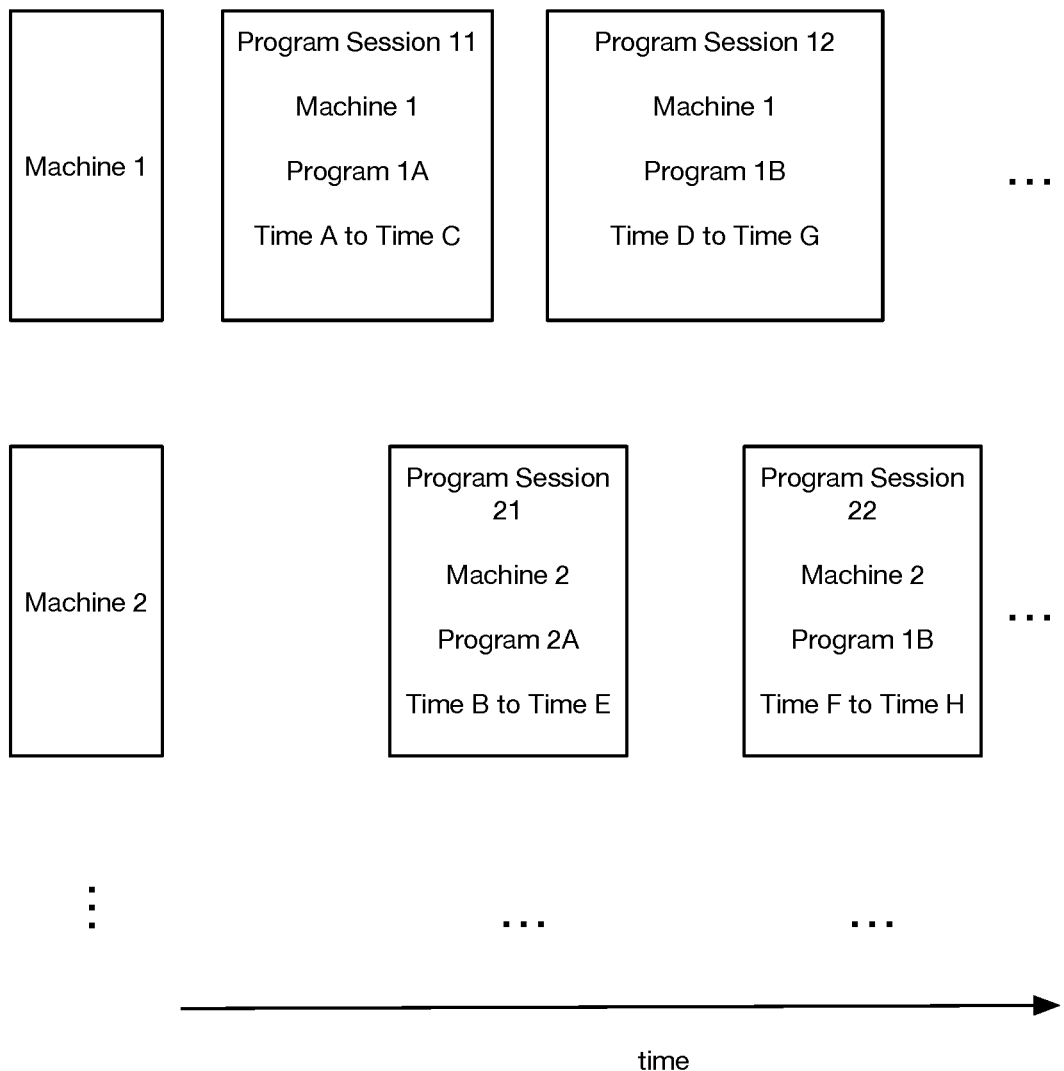
FIG. 5 depicts an illustrative example of program sessions.

Each machine can execute one or more programs (e.g., a manufacturing programs). Each program can be identified by a program identifier, or not be identified by a program identifier. Each program can be executed during one or more program sessions. A program session is preferably a continuous period of time during which the same program executed on the same machine, but can additionally and/or alternatively be a continuous period of time during which any program executed on a given machine, and/or otherwise defined. Each program session can be associated with: a time window (session timeframe), a set of program identifiers for the programs being executed during the session, a machine identifier, a set of component identifiers (e.g., for components manipulated by the program), machine state information (e.g., error codes, joint positions, etc.), sensor measurements, timestamps (e.g., for any of the other pieces of program session data), and/or any other suitable program session data (e.g., as shown in FIG. 5).

However, the set of machines can be otherwise configured.

The components can be physical components produced by a set of machines in a factory. One or more components can be assembled into a higher-order component (e.g., a product including multiple chipsets can be assembled onto the main printed circuit board), or not be assembled into a higher-order component. Examples of components can include: printed circuit boards, diodes (e.g., p-n junction, light-emitting diodes, laser diodes, etc.), transistors (e.g., bipolar junction transistor, field-effect transistor, metal-oxide semiconductor, etc.), and/or any other suitable components.

Each component is preferably identified by a component identifier, but can additionally and/or alternatively be unidentified or otherwise identified. Examples of component identifiers that can be used can include: a barcode (e.g., QR code), a visual appearance (e.g., a hash of the appearance, etc.), an alphanumeric identifier, an RF tag, and/or any other identifier. The component identifier can be read by the machine and associated with the program session using a barcode scanner, a camera, and/or any other sensor. Each component identifier is preferably unique (e.g., globally unique, unique within a factory, etc.), but can additionally and/or alternatively be non-unique, and/or otherwise defined. A person of skill in the art will recognize that some component identifiers (e.g., barcodes, RF tags, etc.) may be locally unique (e.g., unique within the scope of a single factory, single customer, and/or temporal window) but not globally unique; accordingly, it may be preferable to consider such component identifiers within the scope in which they are unique (e.g., associate information indicative of that scope with the component identifier, such as wherein information indicative of a barcode can be stored in association with information indicative of the factory and/or customer with which the component is associated).

Each component is preferably manufactured by a series of programs, executed by the set of machines, but can additionally and/or alternatively be otherwise manufactured. The components are preferably manufactured as part of a batch, but can alternatively be individually manufactured. The series of programs is preferably the same for all components within a manufacturing batch, but can additionally and/or alternatively be different for components within a manufacturing batch.

The series of programs is preferably unknown for the component or batch, and is inferred from the program data generated by the machines (e.g., from the set of component identifiers for the program session), but can additionally and/or alternatively be partially or entirely determined from a manufacturing execution system (MES) (e.g., received from the factory), received from the factory entity, and/or otherwise determined. The series of programs can include: a set of programs or session identifiers, an order between processes within the set of programs, and/or any other suitable information. A program or program session can be included in one or more program series (e.g., a batch manufactured by a common program can be split into sub-batches that are subjected to different downstream processes; batches manufactured by different programs can be combined into a super-batch that is subjected to a common downstream process; etc.).

However, the set of components can be otherwise configured.

The method can be performed by set of computing systems, which can function to execute all or portions of the method, and/or perform any other suitable functionality. The computing system can be: a distributed computing system, a cloud computing system, a local computing system (e.g., an on-premises computing system), a user device (e.g., smartphone, laptop, desktop, tablet, etc.), and/or any other suitable computing system. However, any other suitable set of computing systems can be used.

However, the method can additionally or alternatively be performed using any other suitable system.

4. Method

The method can include one or more of: determining data for a set of programs S100, determining relationships between the set of programs S200, determining an analysis based on the program relationships S300, acting based on analyses S400, operating manufacturing system machines S15, and/or any other suitable elements. One or more instances of the method can be repeated for different: programs, machines, components, factories, layouts of machines in a factory, time windows, and/or otherwise be repeated.

The method preferably functions to reconstruct a series (e.g., unknown series) of programs that were used to manufacture a set of components. The method is preferably performed using the system described above, but can additionally and/or alternatively be performed by any other suitable system. All or portions of the method can be performed: asynchronously from component manufacture, in real-time, and/or be otherwise performed.

4.1 Determining Data for a Set of Programs.

Determining data for a set of programs S100 can function to determine data (e.g., low-level data) to be compared. The set of programs preferably includes multiple programs, but can additionally and/or alternatively include one program, and/or any other suitable number of programs. The set of programs can include: programs from all factories, programs from all factories associated with a single entity, programs from a single factory, programs from a factory region and/or network, and/or any other suitable set of programs. The set of programs can include programs from: a predetermined time window (e.g., a known manufacturing period), a predetermined set of time windows, all time windows, and/or any other suitable time. The set of programs preferably includes more programs that those used to manufacture the component, but can additionally and/or alternatively include only the programs used to manufacture the component, include less programs that those used to manufacture the component, and/or include any other suitable programs.

S100 preferably determines data for each program session, but can alternatively determine data for each program (e.g., spanning one or more sessions), and/or determine data for any other suitable set of program sessions. The data is preferably low-level data (e.g., program session data; transcripts of what exactly the machines are doing when executing a program, measurements sampled by the machine and/or sensors during program execution, etc.; example shown in FIG. 5), but can alternatively be summary data (e.g., summaries of the low-level data, deduplicated versions of the low-level data), program data (e.g., including data from one or more program sessions) and/or be any other suitable data. The data is preferably exhaustive (e.g., includes data for all programs within the set of programs), but can additionally and/or alternatively be non-exhaustive (e.g., includes data for a subset of programs within the set of programs).

The data is preferably obtained from the machines themselves, but can alternatively be obtained from the factory, an entity database, and/or from any other suitable data source. The data is preferably obtained asynchronously from component program execution, but can alternatively be obtained in real- or near-real time. The data is preferably stored on a distributed database (e.g., distributed cloud database), but can additionally and/or alternatively be downloaded and stored on a local database (e.g., of a computer).

However, the data for the set of programs can be otherwise determined.

4.2 Determining Relationships Between the Set of Programs.

Determining relationships between the set of programs S200 can function to identify a series of programs used to manufacture a set of components (e.g., batch of components). The relationships can include: the programs within each program series (e.g., which programs are used to manufacture a component, which programs are linked together, etc.), an order of programs within the program series (e.g., in what or der the programs are linked together), and/or any other suitable relationship.

S200 can be performed using a distributed database (e.g., delegated to an external system), a centralized database, and/or any other suitable database. The relationships are preferably determined automatically, but can additionally and/or alternatively be determined manually. The relationships can be determined based on: time windows, timesteps, and/or timestamps associated with a program session; a layout of machines in a factory; component identifier overlap within different programs' data; a threshold metric (e.g., predetermined, determined dynamically, etc.); compatibility criteria and/or score; and/or otherwise determined. The relationships can be determined using: cardinality estimation methods such as probabilistic cardinality estimators (e.g., HyperLogLog, HyperLogLog++, streaming approach such as Historic Inverse Probability or martingale estimator, etc.) and/or exact cardinality determination methods, intersection estimation methods (e.g., inclusion-exclusion principle, etc.) heuristics, trained machine learning models, and/or any other suitable model(s).

S200 can include: determining programs within a program series used to manufacture a set of components; determining an order of programs within the program series; and/or any other suitable set of processes.

Determining the programs within a program series functions to identify the programs used to manufacture a component.

In a first variant, the programs within a program series are determined based on the program session data. This can include: determining comparison sets of program session data for each of a set of programs; determining an intersection metric between the programs within each comparison set; and determining whether the programs within the comparison set are within the same program series based on the intersection metric.

Each comparison set preferably includes data for two program sessions, but can alternatively include data for two programs, for more than two program sessions, for more than two programs, and/or for any other suitable set of programs or program sessions. The comparison sets can collectively encompass all program session combinations (e.g., with or without repetition), encompass a subset of all possible program session combinations (e.g., be limited to program sessions from a shared factory or timeframe), and/or encompass any other suitable proportion of program session combinations.

The intersection metric is preferably associated with (e.g., directly proportional to) the cardinality of the intersection between the program sessions (e.g., the number of distinct elements shared between the program session data sets), but can additionally or alternatively be associated with the cardinality of the difference between the program sessions (e.g., the number of distinct elements differing between the program session data sets), the cardinality of the union between the program sessions (e.g., the number of distinct elements in either of the program sessions), and/or any other suitable cardinality associated with the program sessions. In a first example, the intersection metric is equal to (or alternatively, is associated with) the Jaccard index, which is defined as the intersection cardinality divided by the union cardinality (e.g., for a first program set A and a second program set B, the Jaccard index is equal to $$\frac{|A \cap B|}{|A \cup B|},$$

where $|X|$ represents the cardinality of X). In a second example, the intersection metric is equal to (or alternatively, is associated with) the intersection cardinality divided by the smallest of the individual program set cardinalities (e.g., for a program set A having cardinality $|A|$ and a program set B having cardinality |B| smaller than |A|, the smallest of the individual program set cardinalities is |B|, and so the metric is equal to $$\frac{|A \cap B|}{|B|};$$

whereas if |B| is greater than |A|, the smallest of the individual program set cardinalities is |A|, and so the metric is equal to $$\frac{|A \cap B|}{|A|};$$

generally, this can be represented as $$\frac{|A \cap B|}{\min\{|A|, |B|\}}$$

for a program set A having cardinality |A| and a program set B having cardinality |B|).

Figure 6:
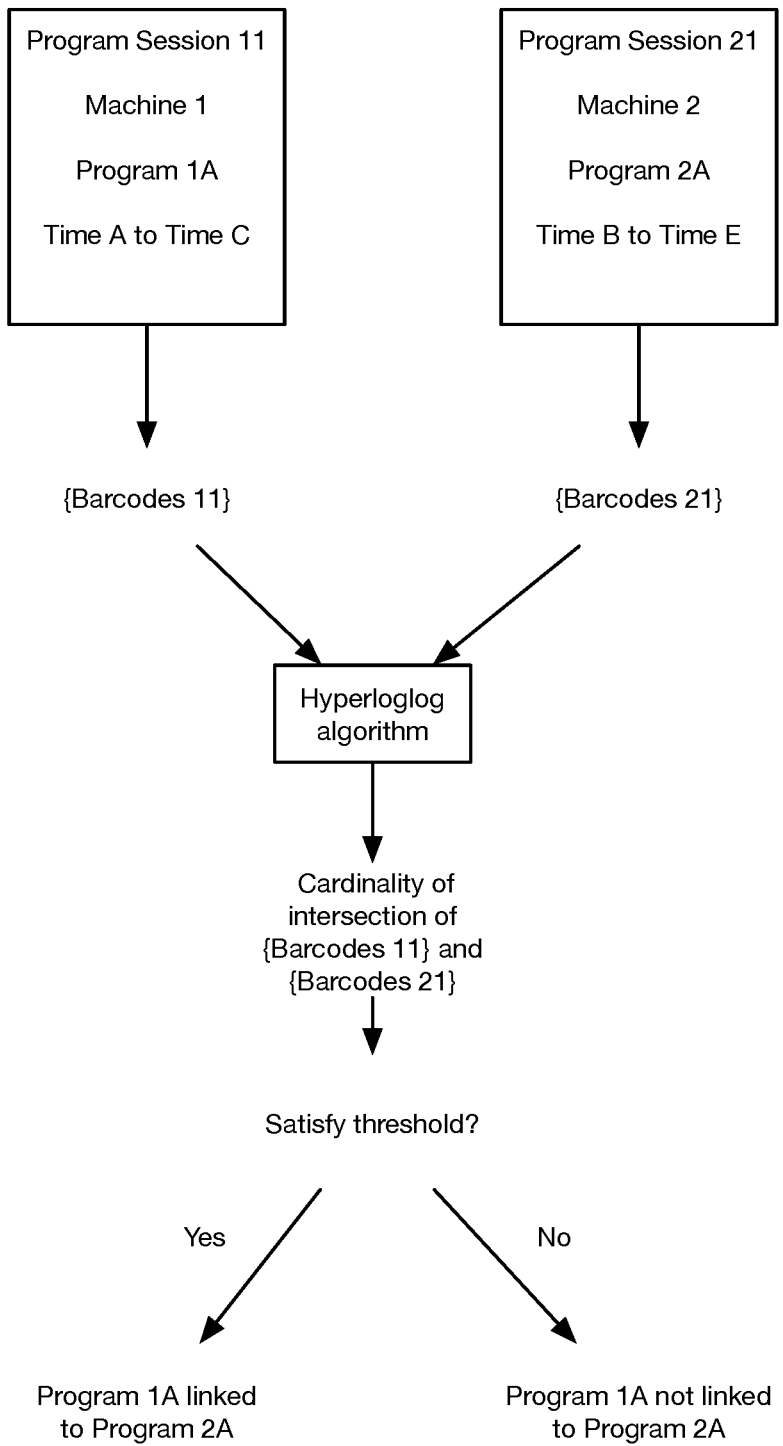
FIG. 6 depicts an illustrative example of determining a relationship between two programs.

Additionally or alternatively, the intersection metric can be a probability of intersection between the program session data, and/or be any other intersection metric. The number of distinct elements within the program session data set can be determined using probabilistic cardinality estimators, such as log log (e.g., hyperloglog, superloglog, etc.), Flajolet-Martin, a naïve algorithm, and/or other estimators, or be otherwise determined. In a first example, log log algorithms can be used when the data is stored in a distributed database (e.g., example shown in FIG. 6). In a second example, naïve algorithms can be used when the data is stored in a centralized database. However, any other algorithm and/or set thereof can be used. The intersection can be determined using inclusion-exclusion methods, a machine learning model (e.g., a classifier), and/or by any other suitable model. The elements are preferably component identifiers, but can alternatively be any other suitable element.

The program sessions (and associated programs) can be considered to be within a shared program series when the intersection metric exceeds a threshold value, is associated with a predetermined label, and/or when any other suitable inclusion condition is met. The threshold can be less than 10%, 10%, 15%, 20%, 25%, 30%, 40%, 50%, 60%, 70%, 75%, 80%, 85%, 90%, greater than 90%, within any range bounded by one or more of the aforementioned values, and/or other suitable threshold value. In some embodiments (e.g., in which a false match may lead to erroneous analyses, whereas a missed match would lead only to less complete analyses), it may be preferable to avoid false matches, and rather bias toward missed matches; in such embodiments, it may accordingly be preferable to select a higher threshold value (e.g., 70%, 75%, 80%, 85%, 90%, greater than 90%, other value between 70-90%, etc.), but a lower threshold value (e.g., less than 70%) may alternatively be employed. Additionally or alternatively, the program sessions can be considered to be outside of a shared program series when the inclusion metric falls below a threshold value, is associated with a different predetermined label, and/or when any other suitable exclusion condition is met.

In an illustrative example, determining programs within a program series can include: determining component identifier sets for program sessions from a distributed database (e.g., distributed cloud database); generating log log data sketches (e.g., wherein the data sketch does not store every single data point) for the component identifier sets using a log log algorithm; estimating the cardinalities of intersection between pairs of log log data sketches; and determining that programs are part of the same program series based on satisfaction of a threshold-based criterion associated with the estimated cardinalities of intersection (e.g., large percentage overlap between log log data sketches, such as large ratio of intersection cardinality over smallest individual program set cardinality or large Jaccard index, etc.).

In a second variant, the programs within a program series are determined based on heuristics. In a first embodiment, the programs within the program series are determined based on a priori process knowledge, the available programs (e.g., within a factory), and optionally time data. For example, PNP programs, soldering programs, soldering inspection programs, heating programs, and inspection programs are known to be part of the same process flow, and can be grouped into the same program series. In a second embodiment, the programs within the program series are determined based on physical connections. For example, a set of machines can have a known shared physical connection or conveyance, wherein programs executed by the set of machines during a time window and/or following each other in time (along the direction defined by the flow of components along the shared physical connection) can be automatically grouped into the same program series (e.g., for a solder printing program, immediately followed by and/or overlapping in time with a solder paste inspection program, immediately followed by and/or overlapping in time with a pick and place program, immediately followed by and/or overlapping in time with a reflow program, immediately followed by and/or overlapping in time with an automated optical inspection program, all performed by a set of machines arranged in an assembly line, all of the aforementioned programs can be automatically grouped into a program series).

In a third variant, the programs within a program series are determined based on program names. In a first embodiment, the programs within a program series are determined based on matching prefixes (and/or other elements) within their program names. For example, each program name may begin with one or more prefixes indicative of shared properties of a program series (e.g., customer code corresponding to a customer of the manufacturing system, job code corresponding to a production run of a product, etc.). In this example, all programs (e.g., within a single manufacturing system, such as a single factory) for which such a prefix element matches can be assigned to the same program series; alternatively, all such programs can be determined to be candidates for potential matching (e.g., as described herein regarding the other variants, such as based on program session data and/or heuristics), wherein programs for which the prefix does not match can be considered to have essentially been 'filtered out' of consideration for inclusion in that program series.

Additionally or alternatively, the programs within a program series can be determined using a combination of any two or more of the aforementioned variants. For example, subsets of the program series can be determined using the second and/or third variants, and the subsets can be grouped into a super-set using the first variant. This can be useful when some machines do not measure the element (e.g., do not determine the component identifier).

However, the programs within the program series can be otherwise determined.

Determining an order of programs within the program series functions to determine the relative order of program execution during component manufacture or assembly.

In a first variant, the program order can be determined using a set of timestamps for shared elements (e.g., component identifier), wherein programs with earlier timestamps for a given element (e.g., component identifier) can be ordered earlier than programs with later timestamps. The timestamps for one or more unique elements can be retrieved from the database storing the program session data or otherwise determined.

Figure 4:
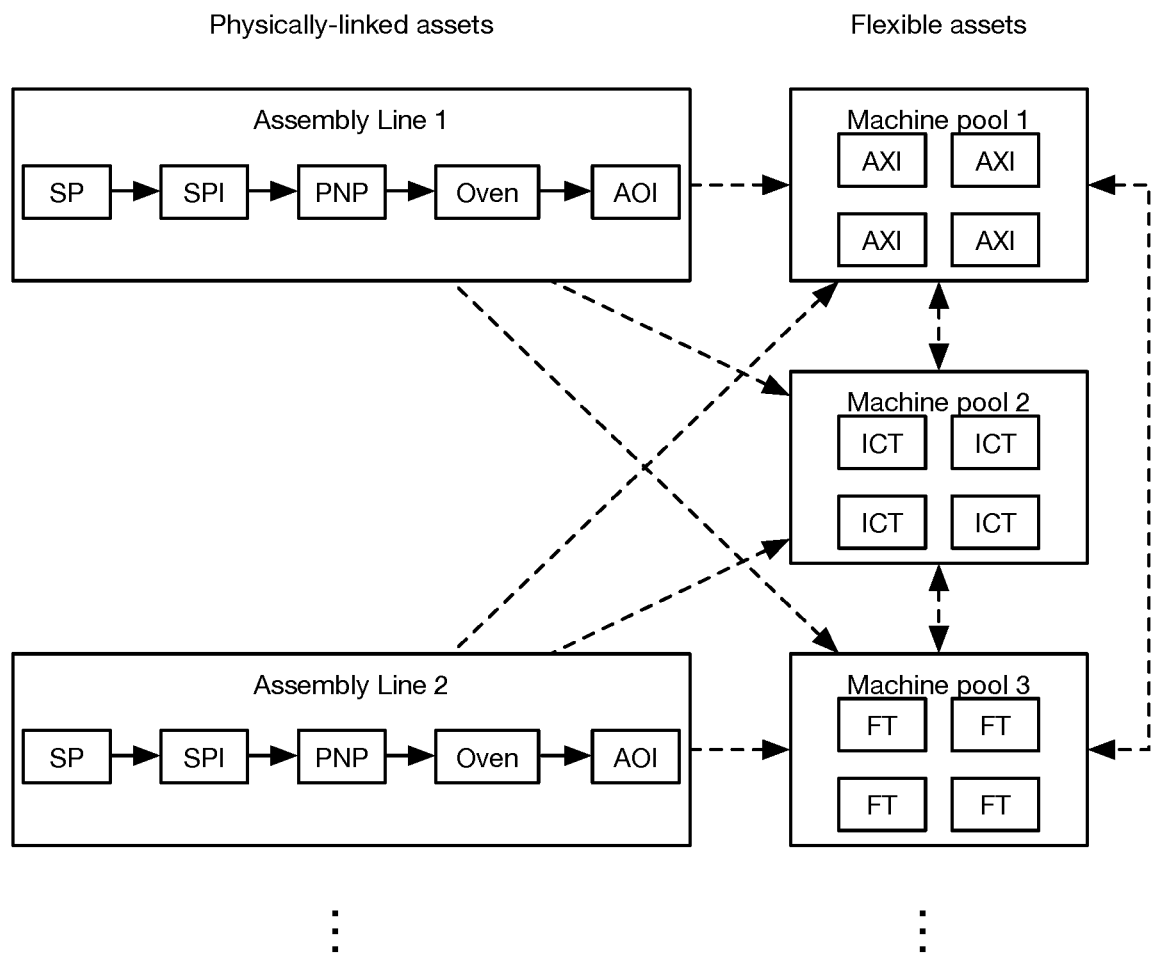
FIG. 4 depicts an illustrative example of a layout of machines in a factory.

In a second variant, the program order can be determined using heuristics. In a first embodiment, this can include: determining a shared physical connection or conveyance between machines in a factory, optionally determining a direction of component conveyance between the machines, and setting the program order based on the physical machine position along the conveyance path. For example, the layout of machines (e.g., physically-linked machines that are part of the same assembly-line) for printed circuit board production can be machines physically arranged in a sequential order of: a solder printer, a SPI machine, a PNP machine, an oven, and a AOI machine; example shown in FIG. 4. As such, a program executing on the solder printer must be ordered before a program running on the SPI machine, a program executing on the SPI machine must be ordered before a program running on the PNP machine, and a program executing on the PNP machine must be ordered before a program running on the oven, a program executing on the oven must be ordered before a program running on the AOI machine.

In a second embodiment, the order can be determined based on a priori knowledge of manufacturing processes. For example, a PNP program can be ordered before a solder printing program, which can be ordered before an SPI program, which can be ordered before a baking program, which can be ordered before an AOI program, based on a priori process knowledge.

In a third variant, the order can be determined based on temporal overlap and/or proximity. In an example, this can be performed such as described in U.S. patent application Ser. No. 18/217,757, filed 3 Jul. 2023 and titled "METHOD FOR MANUFACTURING SYSTEM ANALYSIS AND/OR MAINTENANCE", which is herein incorporated in its entirety by this reference (e.g., as described therein regarding the 'method 100 for factory analysis and/or maintenance').

However, the order of programs within the program series can be determined using a combination of the above or otherwise determined.

However, the relationships between the set of programs can be otherwise determined.

S200 can optionally include removing false positive relationships between programs. The false positive relationships are preferably not used to determine an analysis, but can additionally and/or alternatively be used to determine an analysis, and/or be otherwise used. The false positive relationships between programs can be determined based on: a compatibility criteria and/or score (e.g., compatible number of array positions in panelization), a threshold, and/or otherwise determined. In an example, when a compatibility criteria is not satisfied, a relationship is determined to be a false positive relationship. In another example, when a compatibility score is less than a predetermined threshold, a relationship is determined to be a false positive relationship.

However, the false positive relationships between programs can be otherwise removed.

4.3 Determining an Analysis Based on the Program Relationships.

Determining an analysis based on the program relationships S300 can function to analyze the program series for a component (e.g., a component batch) and/or the program session data thereof. Examples of analyses can include: component defect explainability (e.g., component defect caused by a specific machine and/or a specific program, component defect is not actually an issue, distributed blame, etc.), evolution of programs (e.g., based on leveraging time windows associated with program sessions), program relationships for a specific component, and/or any other suitable information. In some examples, determining the analysis can include performing one or more elements (e.g., the entire 'method 100' described therein, or any suitable elements thereof) such as described in U.S. patent application Ser. No. 18/217,757, filed 3 Jul. 2023 and titled "METHOD FOR MANUFACTURING SYSTEM ANALYSIS AND/OR MAINTENANCE", which is herein incorporated in its entirety by this reference (e.g., S300 may include 'receiving factory information S110' and/or 'associating metrics with factory components S120' as described therein).

The analysis is preferably determined automatically (e.g., by a computing system), but can additionally and/or alternatively be determined manually. The analysis is preferably determined based on the program series, but can additionally and/or alternatively be determined based on any other suitable information. For example, for a specific program series (e.g., determined in S200), all components within a manufacturing batch can be considered to be manufactured by each program within the series of programs, wherein the series of programs is executed by a set of machines. Using this insight, the series of programs can be used to trace origins of component defects back to the upstream programs and/or the machines executing the upstream programs that were involved in producing the component.

However, the analysis based on the program relationships can be otherwise determined.

The information provided for analysis is preferably data indicative of program information (e.g., indicative of which programs are run at the manufacturing system, more preferably indicative of which manufacturing system machines each program is run on and/or the associated times during which each program is run). The data can include one or more of: low-level data (e.g., program session data; transcripts of what exactly the machines are doing when executing a program, measurements sampled by the machine and/or sensors during program execution, etc.), summary data (e.g., summaries of the low-level data, deduplicated versions of the low-level data), program data (e.g., including data from one or more program sessions), and/or any other suitable data. The data is preferably exhaustive (e.g., includes data for all programs within the set of programs), but can additionally and/or alternatively be non-exhaustive (e.g., includes data for a subset of programs within the set of programs). Further, the information provided for analysis can additionally or alternatively include manufacturing system state, defect detection, metric values, histograms, descriptive statistics, and/or any other suitable information (e.g., as described in U.S. patent application Ser. No. 18/217,757, filed 3 Jul. 2023 and titled "METHOD FOR MANUFACTURING SYSTEM ANALYSIS AND/OR MAINTENANCE", which is herein incorporated in its entirety by this reference, such as described therein regarding 'operating factory machines S105'). The information is preferably received such as described above regarding S100, but can additionally or alternatively include any other suitable information to be used in any suitable manner.

4.4 Acting Based on Analyses.

Figure 3:
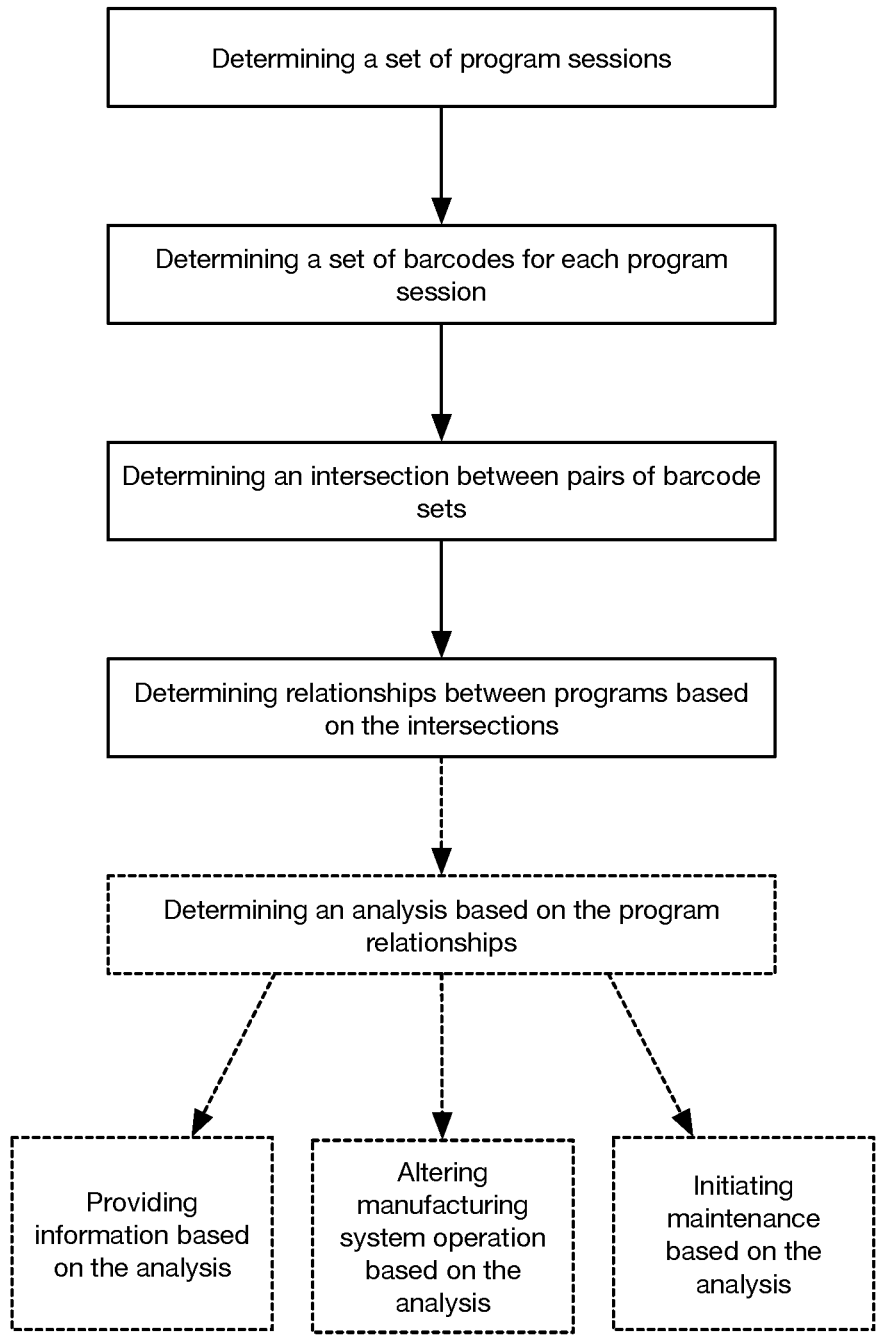
FIG. 3 depicts an illustrative example of a variant of the method.

The method can optionally include acting based on analyses S400 (e.g., based on analyses determined as described above regarding S300, preferably based on the analysis determined in S300). S400 can function to improve, enable improvement of, and/or facilitate improvement of manufacturing system function (e.g., by decreasing defect rates, increasing production rates, decreasing variance, etc.). In some embodiments, S400 can include: providing information based on one or more analyses (e.g., the analysis determined in S300); altering manufacturing system operation based on one or more analyses; and/or initiating maintenance based on one or more analyses (e.g., as shown in FIG. 3).

Providing information based on the analyses can include presenting information (e.g., derivative information, such as information determined based on the information received in S100, determinations made in S200, and/or analysis determined in S300) to one or more users. For example, S130 can include presenting potentially-problematic programs, program series, and/or associated manufacturing system components (e.g., machines) to the users (e.g., providing information indicative of the potential problem(s) to the users).

Additionally or alternatively, S400 can include taking action in response to determining that an aspect (e.g., machine, machine component, program, program series, etc.) of a manufacturing system may be problematic. For example, S400 can include alerting users, altering manufacturing line operation (e.g., to avoid or reduce use of the problematic factory component), and/or initiating maintenance (e.g., of the problematic component and/or other associated factory components). Determining that the aspect may be problematic is preferably performed based on the analysis determined in S300, but can additionally or alternatively be performed in any other suitable manner.

Additionally or alternatively, S400 can include presenting the analyses and/or derivative information to one or more users in a manner that enables the user(s) to explore various aspects of the information, such as via a user interface (UI) that enables viewing data slices associated with various defects, product components, manufacturing system components (e.g., machines, machine components, programs and/or parameters thereof, etc.), and/or any other suitable aspects.

In some examples, acting based on the analysis can include performing one or more elements (e.g., the entire 'method 100' described therein, or any suitable elements thereof) such as described in U.S. patent application Ser. No. 18/217,757, filed 3 Jul. 2023 and titled "METHOD FOR MANUFACTURING SYSTEM ANALYSIS AND/OR MAINTENANCE", which is herein incorporated in its entirety by this reference (e.g., S400 may include 'acting based on metric associations S130', and/or 'operating factory machines S105' as described therein).

However, S400 can additionally or alternatively include taking any other suitable actions based on the analyses (and/or based on any other suitable information determined and/or received in performance of the method).

4.5 Operating Manufacturing System Machines.

The method can optionally include operating manufacturing system machines S15, which can function to manufacture and/or inspect the products (e.g., SMT boards, injection-molded objects, etc.) designated to be produced by the factory machines. S15 can include operating the fabrication/assembly machines (e.g., based on the programming associated with one or more products), operating the inspection machines (e.g., based on the programming associated with the one or more products), and/or providing information for analysis (e.g., provided to one or more analysis tools, such as computing systems).

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A method for manufacturing system analysis, comprising:
   receiving, comprising executing first software instructions stored in one or more memories, information indicative of:
      a first set of products processed in a first program session of a first tool of a manufacturing system; and
      a second set of products processed in a second program session of a second tool of the manufacturing system;
   storing the information in one or more memories;
   determining, comprising executing second software instructions stored in one or more memories, an intersection metric between the first set and the second set; and
   based on the intersection metric, linking the first program session to the second program session, comprising executing third software instructions stored in one or more memories.

2. The method of claim 1, wherein the information is further indicative of a third set of products processed in a third program session of a third tool of the manufacturing system; the method further comprising:
   determining a second intersection metric between the first set and the third set; and
   based on the second intersection metric, linking the first program session to the third program session.

3. The method of claim 1, wherein the information is further indicative of:
   a third set of products processed in a third program session; and
   a fourth set of products processed in a fourth program session;
   the method further comprising:
   determining a second intersection metric between the third set and the fourth set; and
   based on the second intersection metric, linking the third program session to the fourth program session.

4. The method of claim 3, wherein the third program session is a program session of the first tool; the method further comprising, based on the first program session and the third program session being associated with the same tool, not linking the first program session to the third program session.

5. The method of claim 4, wherein the method does not comprise determining a third intersection metric between the third set and the first set.

6. The method of claim 3, further comprising:
determining a third intersection metric between the first set and the third set; and
based on the third intersection metric, not linking the first program session to the third program session.

7. The method of claim 6, wherein:
the intersection metric exceeds a threshold value, wherein linking the first program session to the second program session is performed based on the intersection metric exceeding the threshold value;
the second intersection metric exceeds the threshold value, wherein linking the third program session to the fourth program session is performed based on the second intersection metric exceeding the threshold value; and
the third intersection metric does not exceed the threshold value, wherein not linking the first program session to the third program session is performed based on the third intersection metric not exceeding the threshold value.

8. The method of claim 1, wherein the intersection metric is directly proportional to a cardinality of intersection between the first set and the second set.

9. The method of claim 1, further comprising:
determining an analysis based on the link between the first program session and the second program session; and
controlling manufacturing system operation based on the analysis.

10. The method of claim 9, wherein controlling manufacturing system operation comprises:
identifying a set of components of the manufacturing system that have an elevated probability of defective operation; and
in response to identifying the set of components, selecting the set of components for inspection.

11. The method of claim 1, wherein:
the method further comprises receiving session information indicative of:
a plurality of program sessions, wherein each program session of the plurality is associated with a respective tool of the manufacturing system; and
for each program session of the plurality, a respective time interval during which the program session was running;
the second program session is associated with a second time interval;
a third program session of the plurality is associated with:
a third tool physically linked to the second tool, wherein the third tool is arranged downstream of the second tool along a manufacturing line; and
a third time interval, wherein the second time interval begins before the third time interval; and
the method further comprises, based on the second time interval, the third time interval, and the physical link between the second and third tool, linking the second program session to the third program session.

12. The method of claim 11, wherein the second and third time intervals overlap.

13. The method of claim 12, wherein the second time interval defines a second duration, wherein the third time interval defines a third duration substantially equal to the second duration.

14. The method of claim 13, wherein the physical link is associated with a delay time along the manufacturing line between the second and third tool, wherein the second time interval precedes the third time interval by a duration substantially equal to the delay time.

15. The method of claim 11, wherein the physical link is associated with a delay time along the manufacturing line between the second and third tool, wherein the second time interval precedes the third time interval by a duration substantially equal to the delay time.

16. The method of claim 1, wherein:
the information is further indicative of:
a first program identifier associated with the first program session, the first program identifier comprising a string; and
a third program identifier associated with a third program session, the third program identifier different from the first program identifier, the third program identifier comprising the string; and
the method further comprises:
determining that the first program identifier and the third program identifier both comprise the string; and
based on determining that the first program identifier and the third program identifier both comprise the string, linking the first program session to the third program session.

17. The method of claim 16, wherein the string is a prefix of the first program identifier and of the third program identifier.

18. The method of claim 1, wherein determining the intersection metric comprises:
determining a cardinality of intersection between the first set and the second set; and
determining the first intersection metric based on the cardinality of intersection.

19. The method of claim 18, wherein using the cardinality estimation technique comprises using a probabilistic cardinality estimator.

20. The method of claim 19, wherein the probabilistic cardinality estimator comprises a HyperLogLog algorithm.

21. The method of claim 1, wherein the intersection metric is indicative of a value $$\frac{|A \cap B|}{\min\{|A|, |B|\}},$$

where A represents the first set of products and B represents the second set of products.

22. The method of claim 1, wherein the intersection metric is indicative of the Jaccard index for the first and second sets of products.

23. The method of claim 1, wherein the first software instructions, the second software instructions, and the third software instructions are stored in the same one or more memories.

* * * * *